US010630094B1

(12) United States Patent
Ardaman et al.

(10) Patent No.: US 10,630,094 B1
(45) Date of Patent: Apr. 21, 2020

(54) CHARGING APPARATUS AND RELATED METHODS

(71) Applicants: Andrew Asim Ardaman, Maitland, FL (US); Marc W. Karpel, Northford, CT (US)

(72) Inventors: Andrew Asim Ardaman, Maitland, FL (US); Marc W. Karpel, Northford, CT (US)

(*) Notice: Subject to any disclaimer, the term of this patent is extended or adjusted under 35 U.S.C. 154(b) by 22 days.

(21) Appl. No.: 16/021,305

(22) Filed: Jun. 28, 2018

Related U.S. Application Data

(60) Provisional application No. 62/528,188, filed on Jul. 3, 2017.

(51) Int. Cl.
H02J 7/00 (2006.01)
H01M 10/46 (2006.01)
H01M 10/44 (2006.01)
G06F 1/16 (2006.01)

(52) U.S. Cl.
CPC ............ *H02J 7/0047* (2013.01); *H01M 10/44* (2013.01); *H01M 10/46* (2013.01); *H02J 7/00* (2013.01); *H02J 7/007* (2013.01); *H02J 7/0042* (2013.01); *G06F 1/1632* (2013.01); *H02J 7/0049* (2020.01)

(58) Field of Classification Search
CPC ....... Y02E 60/12; H02J 7/0042; H02J 7/0045; H01M 10/46; H01M 10/44
See application file for complete search history.

(56) References Cited

U.S. PATENT DOCUMENTS

| 5,596,261 | A | 1/1997 | Suyama | |
|---|---|---|---|---|
| 6,229,280 | B1* | 5/2001 | Sakoh | H02J 7/0004 320/106 |
| 6,429,625 | B1 | 8/2002 | LeFevre et al. | |
| 2010/0174667 | A1* | 7/2010 | Vitale | B60L 3/0069 705/412 |
| 2010/0213890 | A1* | 8/2010 | Winger | H02J 7/0047 320/106 |
| 2012/0025765 | A1 | 2/2012 | Frey et al. | |
| 2012/0319487 | A1* | 12/2012 | Shah | H02J 7/0054 307/66 |

* cited by examiner

Primary Examiner — Arun C Williams
(74) Attorney, Agent, or Firm — Allen Dyer Doppelt & Gilchrist, P.A.

(57) ABSTRACT

A charging apparatus for supplying power from a power source to a battery includes a main charging device and a remote indicator cable configured to be releasably connected to the main charging device. The main charging device and the remote indicator cable each have one or more indicator lights. The main charging device is configured for determining a charging profile of the battery upon triggering a learn button on the main charging device. The respective one or more indicator lights on the main charging device and on the indicator cable are configured to show an illumination pattern indicating a specific charging status.

18 Claims, 4 Drawing Sheets

CHARGING APPARATUS AND RELATED METHODS

CROSS-REFERENCE TO RELATED APPLICATION

This application claims the benefit of U.S. Provisional Patent Application Ser. No. 62/528,188, filed on Jul. 3, 2017, the contents of which are herein incorporated by reference in their entirety.

FIELD OF THE INVENTION

The present invention relates to a charging apparatus, and more particularly, to a charging apparatus having a remote indicator cable.

BACKGROUND OF THE INVENTION

Various charging stations or docks on the market today have one or more indicator lights of certain colors to indicate the charge status of a battery or user device. These charging stations or docks, however, occupy space and can be inconvenient for visual determination of charge status from a position at a distance away from the charging station or dock. While currently charging stations are useful, further improvements are possible.

SUMMARY OF THE INVENTION

In view of the foregoing, it is an object of the present invention to provide an improved charging apparatus and related method. According to one embodiment of the present invention, a charging apparatus for supplying power from a power source to a battery includes a main charging device and a remote indicator cable configured to be releasably connected to the main charging device. The main charging device and the remote indicator cable each have one or more indicator lights. The main charging device is configured for determining a charging profile of the battery upon triggering a learn button on the main charging device. The respective one or more indicator lights on the main charging device and on the indicator cable are configured to show an illumination pattern indicating a specific charging status.

According to another embodiment of the present invention, a method of charging a user device using the charging apparatus includes connecting a power adaptor of the user device to a charging connector on the main charging device of the charging apparatus. The remote indicator cable is connected to the main charging device of the charge status indicator. The main charging device is then connected to a power source. A charging profile of the user device is determined via pressing a 'Learn' button on the main charging device. One or more indicator lights on the main charging device or the indicator cable are monitored to determine a charging status of the user device.

These and other objects, aspects and advantages of the present invention will be better appreciated in view of the drawings and following detailed description of preferred embodiments.

DETAILED DESCRIPTION OF PREFERRED EMBODIMENTS

Figure 1:
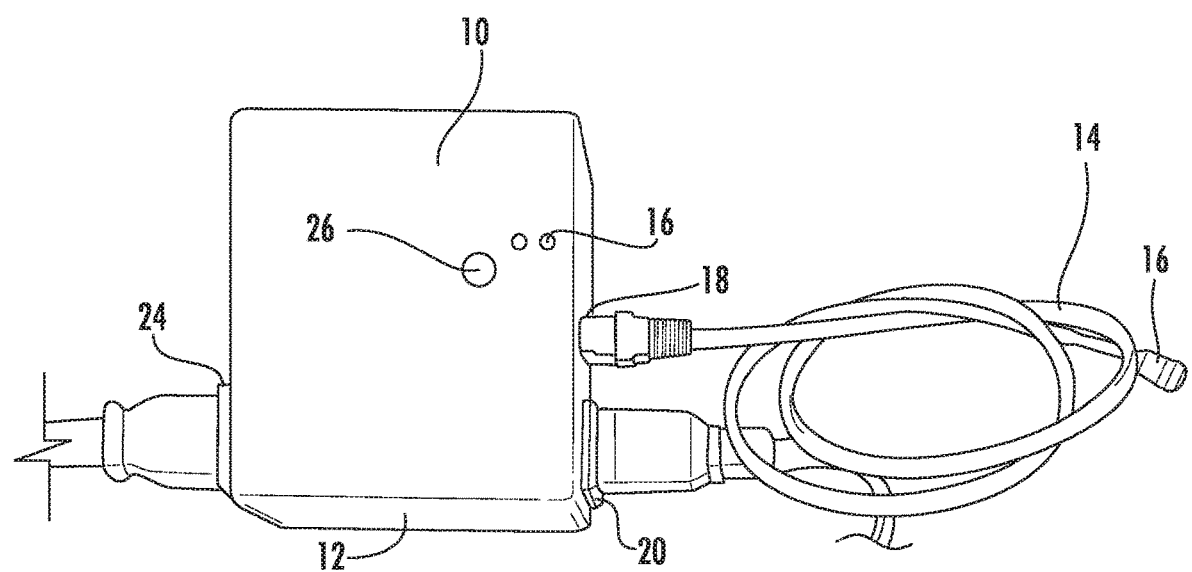
FIG. 1 is a top view of a charging apparatus, according to one embodiment of the present invention.
Figure 2:
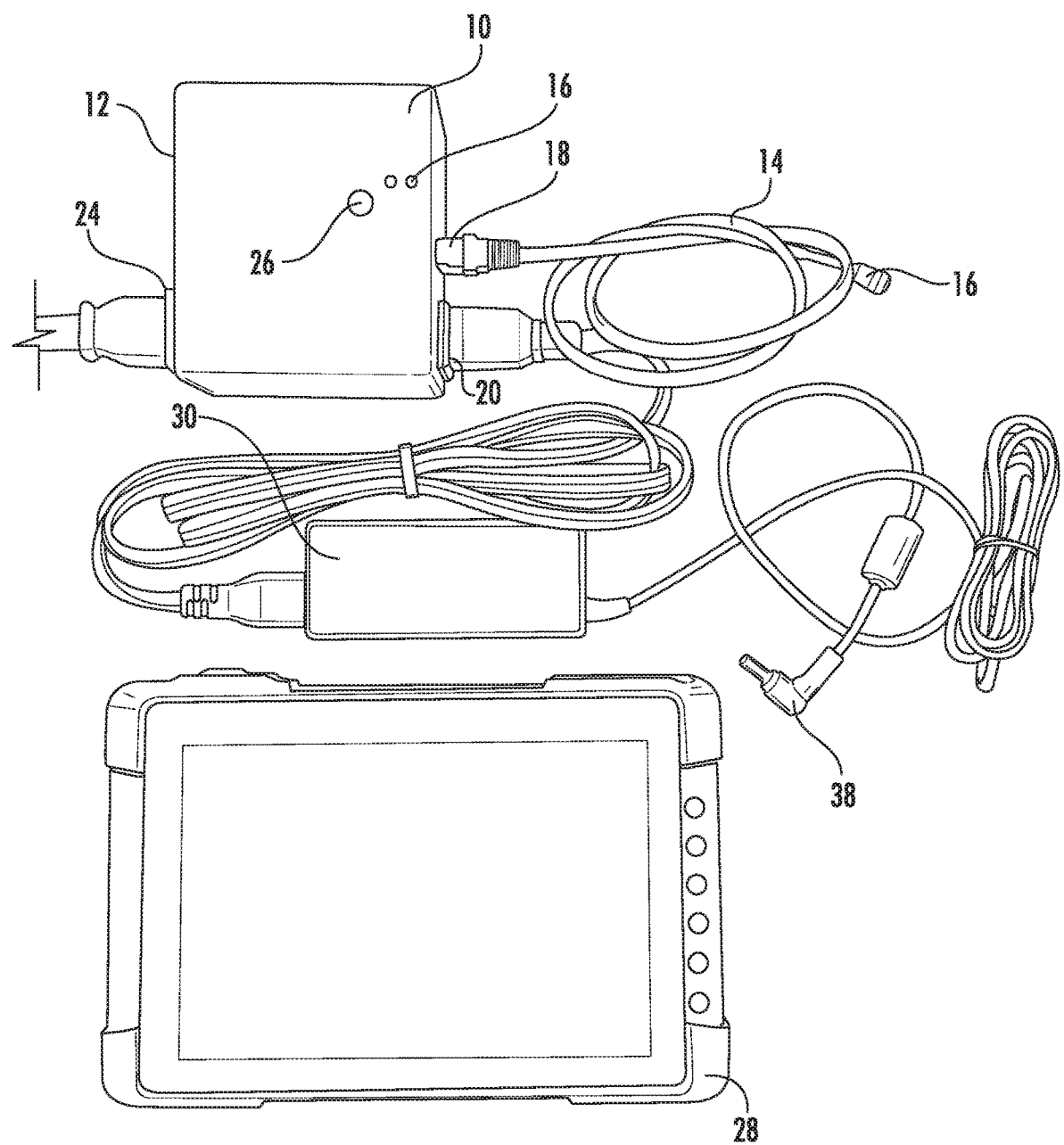
FIG. 2 is a perspective view of the charging apparatus of FIG. 1 connected to a user device to be charged, the power supply cable of the user device is connected to the main charging device and not connected to the user device.
Figure 3:
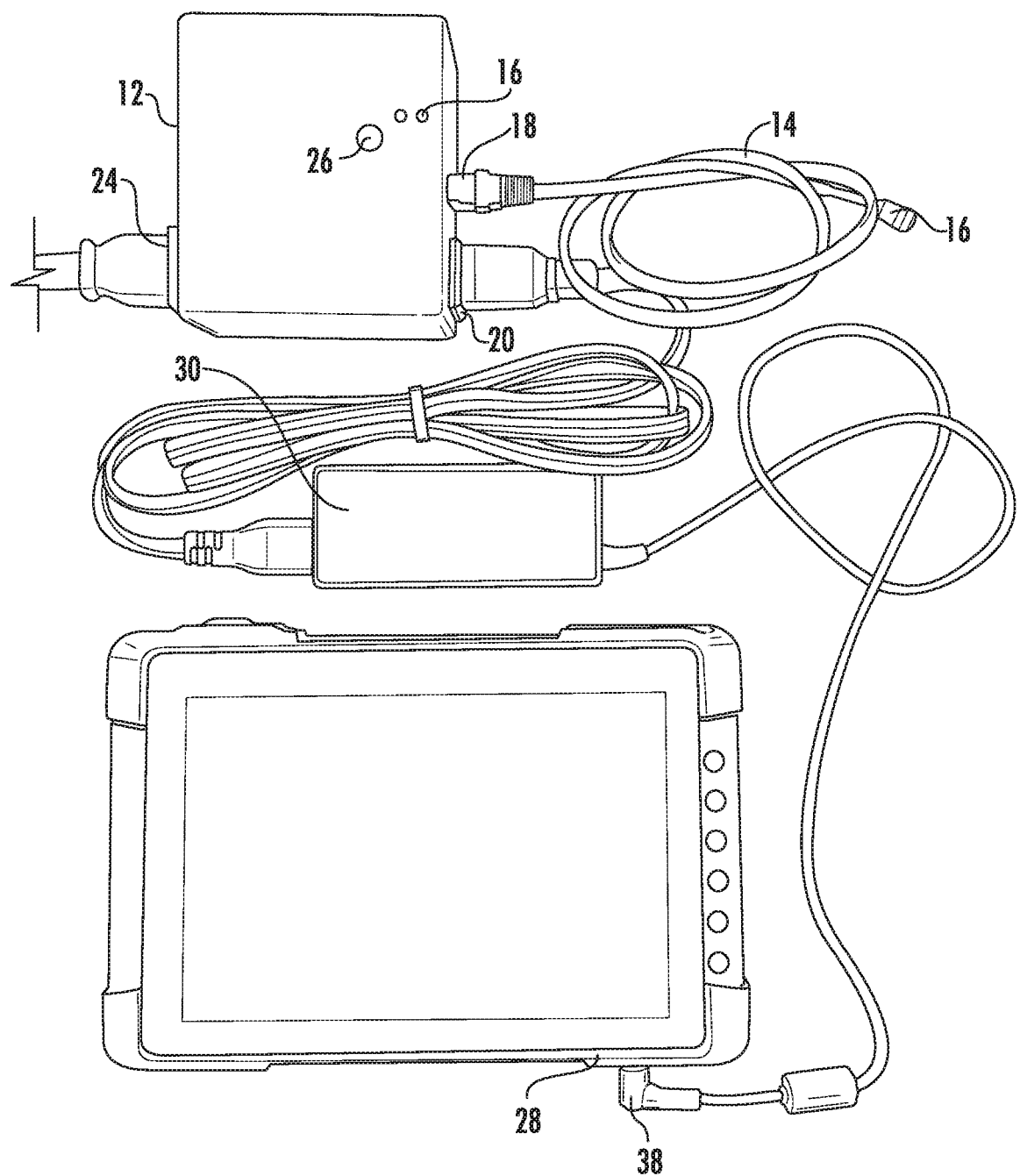
FIG. 3 is a perspective view of the charging apparatus of FIG. 1 connected to a user device to be charged, the power supply cable of the user device is connected to the user device, according to another embodiment of the present invention.

Referring to FIGS. 1-3, according to one embodiment of the present invention, a charging apparatus 10 for supplying power from a power source to a battery of a user device 28 includes a main charging device 12 and a remote indicator cable 14 releasably connected to the main indictor device 12 via a connector 18. Both the main indicator device 12 and the remote indicator cable 14 have one or more indicator lights 16 such as light emitting diodes (LEDs). The one or more indicator lights 16 on the main charging device 12 and on the remote indicator cable 14 are configured to show the same illumination pattern, which indicates charging status.

The main charging device 12 has a charging connector 20 for connection to the battery of the user device 28 and a power source connector 24 for connection with a power supply. The main charging device 12 is configured for determining a charging profile of the battery of the user device 28 upon triggering a button 26 (the 'Learn' button) on the main charging device 12. For example, pressing the 'Learn' button 26 can trigger the main charging device 12 to determine a charging profile such as the charging current and voltage, and thus calculate an estimated charging time. The 'Learn' button 26 can also be configured to enable the main charging device 12 to identify a particular battery and/or device to be charged and store its associated charging profile. As such, if a same device is detected to be connected to the charging apparatus 10 at a different time, the charging apparatus 10 can retrieve the stored charging profile and thus determine the respective charging status. The respective one or more indicator lights 16 on the main indicator device 12 and the indicator cable 14 are configured to show a specific illumination pattern and thus to indicate that the 'Learn button' 26 has finished determining and storing the battery charging profile.

The remote indicator cable 14 is plugged into the connector 18 (e.g., RJ45 receptacle) on the main charging device 12. The one or more indicator lights 16 on the remote indicator cable 14 is at the end of the indicator cable 14. The indicator cable 14 can be extended and oriented such that the one or more indicator lights 16 indicating charging status of the battery of the user device can be seen from a distance and/or in a confined space. The respective one or more indicator lights 16 on the main charging device 12 and on the indicator cable 14 are configured to show an illumination pattern indicating a specific charging status. The charging status include "above [a certain level]" (e.g., >80% charged), "below [a certain level]" (e.g., <80% charged), "charging error," and the like. The charging status can be determined by battery charging current, battery voltage, battery temperature and/or a combination thereof.

In the depicted embodiment, the one or more indicator lights 16 on the main charging device 12 and the remote indicator cable 14 includes a red LED and a green LED. For example, the respective one or more indicator lights 16 on the main charging device 12 and the remote indicator cable 14 can be configured to illuminate red when the battery is below a certain capacity and green when the battery is above a certain capacity. As another example, the respective one or more indicator lights 16 on the main charging device 12 and the remote indicator cable 14 can be configured to illuminate a specific pattern (e.g., alternate flashing between a green indicator and a red indicator) to indicate a charging error.

In one embodiment, the charging profile can be determined by monitoring the current going into the battery being charged. For example, the charging apparatus can measure the current into an AC adapter at 60 Hz for a 120-V supply or at 50 Hz for a 240-V supply. The charging apparatus can also measure DC current if needed. The measurement can be made with one or more Hall-effect sensors. For example, two Hall-effect sensors can be mounted on opposite sides of a printed circuit board with a single-turn loop for each sensor. The one or more Hall-effect sensors can then be fed into an analog-to-digital converter and sampled at a rate of about 1500 Hz. A separate measurement of voltage can be sampled concurrently to relate the waveforms of current and voltage by a power factor. A typical charging profile has an initial constant-current phase followed by a decreasing current phase after the battery has reached certain capacity (often, around 70%). For example, if the initial current is 3.5 A, this will be the constant current charging level "learned" by pressing the 'Learn' button. If a later measurement yields 2.0 A, the battery will be at about 75% of its charge capacity. A later measurement of 1.0 A will indicate that the battery is about 90% charged. The remaining charging time can be calculated based on the charging current. The indicator lights will illuminate as appropriate to indicate charging status. When the battery is removed from the charging apparatus and no current or only idle current is measured, then both the red and the green LEDs will be off, indicating that the device is no longer being charged.

Referring to FIG. 2, the charging apparatus 10 is used to charge the user device 28 such as a laptop. In the depicted embodiment, the one or more indicator lights 16 are on a top side of the main charging device 12. A power source connector 24 on the main indicator device 12 is plugged into a standard 120-V AC outlet or power strip. The one or more red and green LED indicator lights 16 on the main indicator device 12 are configured to show the same pattern red and green LED indicator lights 16 on the remote indicator cable. For example, the one or more indicator lights 16 will illuminate red when the lap top device is charged below 80% of total capacity and green when the lap top device is charged above 80% of total capacity.

Figure 4:
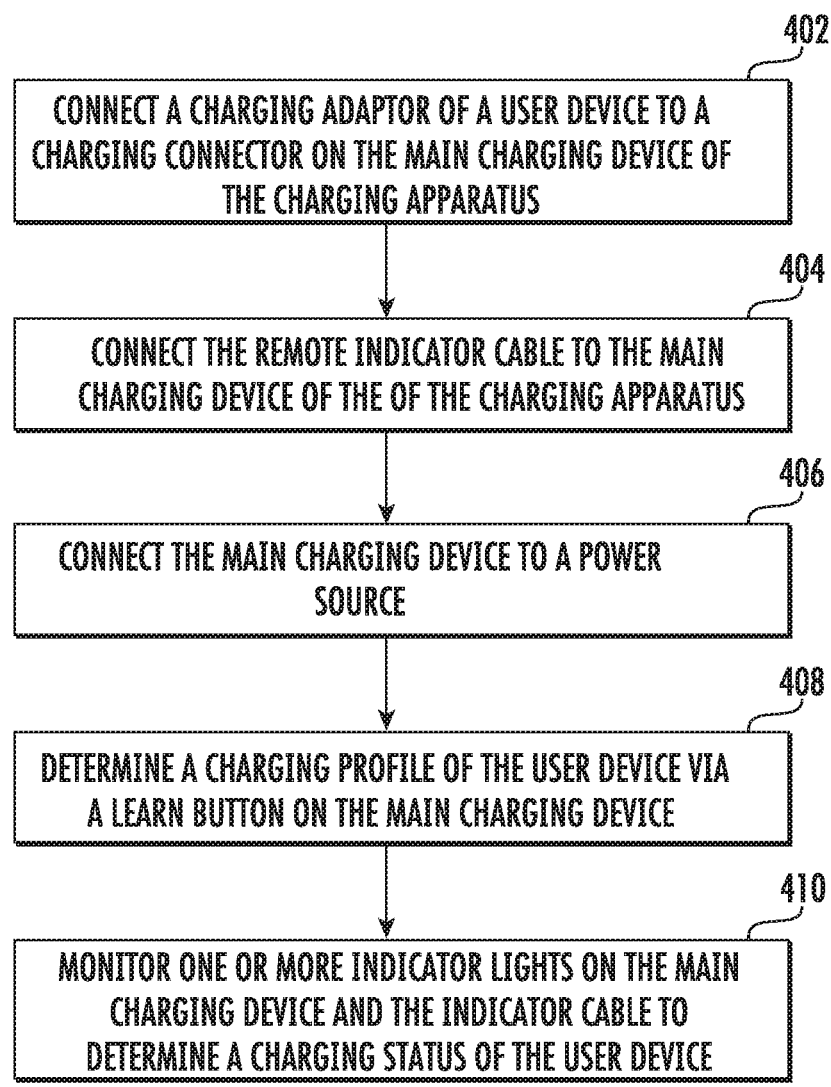
FIG. 4 is a flowchart illustrating a method of charging a user device using a charging apparatus according to one embodiment of the present invention.

Referring to FIG. 4, a method of charging a user device using the charging apparatus includes, at step 402, connecting a power adaptor (e.g., power adaptor 30) of the user device 28 to a charging connector (e.g., charging connector 20) on the main charging device 12 of the charging apparatus 10. The power adaptor 30 of the user device 28 is not connected to the user device (e.g., laptop) yet, as shown in FIG. 3.

At step 404, the remote indicator cable (e.g., remote indicator cable 14) is then connected to the main charging device 12 of the charging apparatus 10. The remote indicator cable 14 is then plugged into a connector 18 (e.g., RJ45 receptacle) on the side of the main device 12. The remote indicator cable 14 has a red and green LED at the end of the indicator cable 14.

At step 406, the main charging device 12 is then connected to a power source. An AC power cord is connected between the AC wall outlet or a power strip and the main charging device 12. For example, once the charging apparatus 10 is connected to the power source, the green LED will blink 3 times, then the red LED will blink 3 times, and then both red and green LED will turn off.

At step 408, the 'Learn' button on the main charging device is pressed to determine a charging profile of a battery of the user device. The indicator 10 can also "learn" and store the charging profile of specific or specific types of user devices, so that once a specific type of user device is identified, the corresponding charging profile can be retrieved and charging status can be determined. If the charging apparatus determines a different electrical grid from the one to which it is currently configured for charging, the charging device will start illuminating an error pattern (e.g., alternating blinking of the red/green indicator lights), and the charging device will need to learn a new electrical grid. If the electrical grid matches what was learned previously, the charging device will measure the current going into the device being charged and display an appropriate charging status.

In one embodiment, the 'Learn' button is pushed for specific amount of time (e.g., 5-7 seconds) until the red LED starts flashing. The red LED stopping flashing and the green LED starting flashing will indicate the power adaptor 32 of the user device 28 can be connected to the user device (e.g., laptop). The one or more indicator lights (e.g., LED lights) are configured to illuminate a specific pattern to indicate a charging profile has been determined. The one or more indicator lights 16 can be configured to flash green for about 2 minutes and then turn steady red. This illumination pattern indicates that the main charging device 12 has determined the charging profile of the user device (e.g., laptop). The connector 38 of the power adaptor 30 can then be plugged into the user device 28 as shown in FIG. 3.

At step 410, one or more indicator lights on the main charging device or the indicator cable are monitored to determine a charging status of the battery of the user device. For example, the respective one or more indicator lights 16 on the main charging device 12 and the remote indicator cable 14 are configured to illuminate red when the battery of the user device 28 is below a certain capacity and illuminate green when the battery is above a certain capacity. As another example, if the charge current connected to the user device (e.g. a laptop) is lower than a threshold for a specific amount of time, the one or more indicator lights 16 are configured to show an error pattern, such as flashing LEDs alternating between red and green. The remote indicator cable 14 can be extended and oriented to enable a user to view the charging status of the user device from a distance.

The user device can be plugged in or unplugged at any time during the charging process, and the charging apparatus 10 will have stored the charging profile for the user device. The remote indicator cable 14 can be extended and oriented in a certain way to enable a user to monitor the charging status from a convenient location (e.g., several meters from the charging device). The remote indicator cable 14 can be disconnected from the main charging device 12 when charging is completed.

The charging apparatus (e.g., remote charging cable) allows remote determination of battery charge level by visual inspection from an inaccessible area or area of limited visual clarity. The indicator lights on the main charging device and on the remote indicator cable will illuminate a pattern to indicate a charging level.

The foregoing is provided for illustrative and exemplary purposes; the present invention is not necessarily limited thereto. Rather, those skilled in the art will appreciate that various modifications, as well as adaptations to particular circumstances, are possible within the scope of the invention as herein shown and described.

What is claimed is:

1. A charging apparatus for supplying power from a power source to a battery, the charging apparatus comprising:
    a main charging device having one or more indicator lights and a charging connection configured to connect the main charging device to the battery for charging; and
    a remote indicator cable having one or more indicator lights located at a distal end thereof, a proximal end of the remote indicator cable being releasably connected to the main charging device separately from the charging connection;
    wherein the main charging device is configured for determining a charging profile of the battery when connected to the charging connection upon triggering a learn button mounted thereon; and
    wherein the respective one or more indicator lights on the main charging device and on the indicator cable are configured to show a same illumination pattern indicating a specific charging status of the battery when connected to the charging connection.

2. The apparatus of claim 1, wherein the respective one or more indicator lights on the main indicator device and the indicator cable are further configured to show a specific illumination pattern to indicate the learn button has finished determining the battery charging profile.

3. The apparatus of claim 1, wherein the charging profile of the battery is stored in the charging apparatus.

4. The apparatus of claim 1, wherein the battery charge profile includes one or more of charging current and voltage of the battery.

5. The apparatus of claim 1, wherein the one or more indicator lights on the main charging device and the remote indicator cable both include a red LED light and a green LED light.

6. The apparatus of claim 1, wherein the respective one or more indicator lights on the main charging device and the remote indicator cable are configured to illuminate red when the battery is below a certain capacity.

7. The apparatus of claim 1, wherein the respective one or more indicator lights on the main charging device and the remote indicator cable are configured to illuminate green when the battery is above a certain capacity.

8. The apparatus of claim 1, wherein the respective one or more indicator lights on the main charging device and the remote indicator cable are configured to illuminate a specific pattern to indicate an error in charging.

9. The apparatus of claim 8, wherein the specific pattern indicating an error is alternate flashing between a green indicator and a red indicator.

10. The apparatus of claim 1, wherein the one or more indicator lights are configured to illuminate an error pattern when a charging current is not matching the battery.

11. A method of charging a user device using a charging apparatus, the charging apparatus includes a main charging device having one or more indicator lights, a remote indicator cable having one or more indicator lights, the remote indicator cable is configured to be releasably connected to the main charging device, the method comprising:
    connecting a power supply cable of the user device to a charging connector on the main charging device of the charging apparatus;
    connecting the remote indicator cable to the main charging device of the charge status indicator independently of the power supply cable;
    connecting the main charging device to a power source;
    pressing a learn button on the main charging device to determine a charging profile of a battery of the user device;
    illuminating one or more indicator lights on the main charging device and the indicator cable to indicate a charging status of the battery; and
    extending the remote indicator cable such that the one or more indicator lights thereon are visible when the main charging device is not.

12. The method of claim 11, wherein a power supply cable of the user device is connected to the main charging device and not connected to the user device before pressing the learn button, and wherein the power supply cable of the user device is further connected to the user device after a specific illumination pattern is shown on the charging apparatus.

13. The method of claim 11, wherein the one or more indicator lights are configured to illuminate at a specific pattern to indicate a charging profile has been determined.

14. The method of claim 11, wherein the remote indicator cable is connected to the main charging device of the charge status indicator via a RJ45 receptacle on the main charging device of the charging apparatus.

15. The method of claim 11, wherein the respective one or more indicator lights on the main charging device and the remote indicator cable are configured to illuminate green when the battery is above a certain capacity.

16. The method of claim 11, wherein the respective one or more indicator lights on the main charging device and the remote indicator cable are configured to illuminate red when the battery is below a certain capacity.

17. The method of claim 11, wherein the respective one or more indicator lights on the main charging device and the remote indicator cable are configured to illuminate a specific pattern indicating an error in charging.

18. The method of claim 17, wherein the specific pattern indicating an error is alternate flashing between a green indicator and a red indicator.

* * * * *